(12) United States Patent
Hsu (10) Patent No.: US 10,675,698 B2
(45) Date of Patent: Jun. 9, 2020

(54) WIRE DELIVERY APPARATUS WITH A NON-ROTATIONAL ACTUATOR

(71) Applicant: ILLINOIS TOOL WORKS INC., Glenview, IL (US)

(72) Inventor: Christopher Hsu, Mentor, OH (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 15/363,702

(22) Filed: Nov. 29, 2016

(65) Prior Publication Data

US 2017/0189982 A1 Jul. 6, 2017

Related U.S. Application Data

(60) Provisional application No. 62/273,832, filed on Dec. 31, 2015.

(51) Int. Cl.
| | | |
|---|---|---|
| *B23K 9/00* | (2006.01) | |
| *B23K 9/067* | (2006.01) | |
| *B23K 9/133* | (2006.01) | |
| *B23K 9/09* | (2006.01) | |
| *B65H 51/18* | (2006.01) | |
| *B23K 9/173* | (2006.01) | |

(52) U.S. Cl.
CPC ............ *B23K 9/067* (2013.01); *B23K 9/09* (2013.01); *B23K 9/133* (2013.01); *B23K 9/1336* (2013.01); *B23K 9/173* (2013.01); *B65H 51/18* (2013.01); *B65H 2701/36* (2013.01)

(58) Field of Classification Search
CPC .......... B23K 9/067; B23K 9/09; B23K 9/133; B23K 9/1336; B23K 9/173

USPC ........ 219/76.16, 76.15, 137.2, 137.7, 137.71
See application file for complete search history.

(56) References Cited

U.S. PATENT DOCUMENTS

| | | | |
|---|---|---|---|
| 1,873,326 A | 8/1932 | Ratigan | |
| 3,055,591 A | 9/1962 | Shepard | |
| 3,062,569 A | 11/1962 | Westermeier | |
| 3,199,644 A | 8/1965 | Clapp | |
| 3,203,268 A | 8/1965 | Manoni | |
| 3,211,944 A * | 10/1965 | Fein | B23K 9/123 |
| | | | 219/137.61 |
| 3,265,268 A | 8/1966 | Bach | |

(Continued)

FOREIGN PATENT DOCUMENTS

| | | |
|---|---|---|
| CN | 201881037 | 6/2011 |
| CN | 202963749 | 6/2013 |

(Continued)

OTHER PUBLICATIONS

International Search Report from PCT application No. PCT/US2016/067798, dated Apr. 19, 2017, 15 pgs.

(Continued)

*Primary Examiner* — Mark H Paschall
(74) *Attorney, Agent, or Firm* — McAndrews, Held & Malloy, Ltd.

(57) ABSTRACT

In certain embodiments, a welding wire delivery system includes a non-rotational actuator configured to engage, disengage, and move welding wire. In certain embodiments, the welding wire delivery system includes a piezoelectric walk motor, a piezoelectric worm drive, a piezoelectric wave drive, a shape memory alloy, a solenoid piston, a linear actuator or motor, or a voice coil actuator.

18 Claims, 10 Drawing Sheets

(56) References Cited

U.S. PATENT DOCUMENTS

| | | | |
|---|---|---|---|
| 3,734,369 A | 5/1973 | Johnson | |
| 4,527,037 A | 7/1985 | Johnson | |
| 4,703,156 A | 10/1987 | Hayes | |
| 4,902,162 A | 2/1990 | Watt | |
| 4,954,690 A | 9/1990 | Kensrue | |
| 5,249,760 A | 10/1993 | Morimoto | |
| 5,281,789 A * | 1/1994 | Merz | B22F 3/115 219/76.15 |
| 5,410,126 A | 4/1995 | Miller | |
| 5,816,466 A | 10/1998 | Seufer | |
| 6,286,748 B1 | 9/2001 | Cooper | |
| 6,356,644 B1 | 3/2002 | Pollak | |
| 6,388,234 B1 | 5/2002 | Collins | |
| 6,427,894 B1 | 8/2002 | Blank | |
| 6,536,644 B2 | 3/2003 | Plow | |
| 6,557,742 B1 | 5/2003 | Bobeczko | |
| 6,568,578 B1 | 5/2003 | Kensrue | |
| 6,963,048 B2 | 11/2005 | Huismann | |
| 6,969,823 B2 | 11/2005 | Huismann | |
| 6,984,806 B2 | 1/2006 | Huismann | |
| 7,165,707 B2 | 1/2007 | Huismann | |
| 7,244,909 B2 | 7/2007 | Kensrue | |
| 7,301,124 B2 | 11/2007 | Kaufman | |
| 7,374,074 B2 | 5/2008 | Matiash | |
| 7,615,723 B2 | 11/2009 | Matiash | |
| 7,767,934 B2 | 8/2010 | Christopher | |
| 7,977,604 B2 | 7/2011 | Ertmer | |
| 8,646,675 B2 * | 2/2014 | Lang | B23K 20/005 228/180.5 |
| 9,446,524 B2 * | 9/2016 | Zhang | B25J 15/0028 |
| 9,833,857 B2 * | 12/2017 | Artelsmair | B23K 9/126 |
| 10,046,419 B2 * | 8/2018 | Denney | B23K 35/0272 |
| 2002/0130153 A1 | 9/2002 | Plow | |
| 2003/0015510 A1 | 1/2003 | Wakeman | |
| 2005/0006425 A1 | 1/2005 | Enyedy | |
| 2005/0016976 A1 | 1/2005 | Belfiore | |
| 2005/0040202 A1 | 2/2005 | Kerekes | |
| 2005/0224486 A1 | 10/2005 | Matiash | |
| 2005/0279805 A1 * | 12/2005 | Wong | B23K 20/004 228/4.5 |
| 2006/0219683 A1 | 10/2006 | Kensrue | |
| 2006/0278623 A1 | 12/2006 | Christopher | |
| 2008/0035624 A1 | 2/2008 | Ertmer | |
| 2008/0257874 A1 | 10/2008 | Kaufman | |
| 2009/0090427 A1 | 4/2009 | Yun | |
| 2009/0277890 A1 | 11/2009 | Leiteritz | |
| 2010/0314373 A1 | 12/2010 | Kaufman | |
| 2011/0220628 A1 | 9/2011 | Mehn | |
| 2012/0152924 A1 | 6/2012 | Christopher | |
| 2012/0152926 A1 | 6/2012 | Matiash | |
| 2012/0248084 A1 | 10/2012 | Romenesko | |
| 2013/0035192 A1 | 2/2013 | Hayashi | |
| 2013/0334190 A1 | 12/2013 | Garvey | |
| 2015/0014383 A1 | 1/2015 | Patterson | |

FOREIGN PATENT DOCUMENTS

| | | |
|---|---|---|
| DE | 20113852 | 11/2001 |
| EP | 1384546 | 1/2004 |
| EP | 1577245 | 9/2005 |
| EP | 2476500 | 7/2012 |
| GB | 1093736 | 12/1967 |
| GB | 2034227 | 6/1980 |
| WO | 0128728 A2 | 4/2001 |
| WO | 03022501 | 1/2003 |
| WO | 2008018960 | 2/2008 |
| WO | 2008018961 | 2/2008 |
| WO | 2013033849 | 3/2013 |

OTHER PUBLICATIONS

Moriwaki et al., "Ultraprecision Feed System Based on Walking Drive," CIRP ANNALS, Elsevier BV, NL, CH, FR, vol. 45, No. 1, Jan. 1, 1996, pp. 505-508.

* cited by examiner

WIRE DELIVERY APPARATUS WITH A NON-ROTATIONAL ACTUATOR

CROSS REFERENCE TO RELATED APPLICATIONS

This application is a Non-provisional U.S. Patent Application of U.S. Provisional Patent Application No. 62/273,832, entitled "Wire Delivery Apparatus with a Non-Rotational Actuator", filed Dec. 31, 2015, which is incorporated herein by reference in its entirety for all purposes.

BACKGROUND

The present disclosure relates generally to welding systems and, more particularly, to welding torches having wire feed systems that include piezoelectric mechanisms, such as piezoelectric walk motors and piezoelectric worm drives.

A wide range of welding systems and welding control regimes have been implemented for various purposes. In continuous welding processes with consumable electrode, gas metal arc welding (GMAW), and more specifically, metal inert gas (MIG) or metal active gas (MAG) techniques (collectively called GMAW) allow for formation of a continuing weld bead by feeding welding wire electrode from a welding torch (welding torch). Electrical power is applied to the welding wire, and a circuit is completed through the workpiece to sustain an arc that melts the welding wire and the workpiece to form a desired weld. Another consumable electrode arc welding process is submerged arc welding (SAW), in which the arc is buried under a bed of flux. A wire consumable can be fed into a GMAW or SAW melt puddle, or into a puddle created by non-consumable electrode processes such as gas tungsten arc welding (GTAW), also known as tungsten inert gas (TIG) welding, plasma arc, laser, electron beam, and so forth, where filler wire is added to the melt pool for welding, cladding, overlaying, hardfacing, and brazing. The added wire can be "cold" or as received (e.g., known as "cold wire"), or preheated resistively or inductively (e.g., known as "hot wire"). The embodiments described herein apply to all the aforementioned processes where wire is used as a consumable, thus the word "welding", as used herein, is hereby defined to include these processes for the purpose of the present disclosure.

Advanced forms of welding with consumable electrode can be based upon controlled short circuits between the welding wire and the advancing weld puddle formed from melted metal of the workpieces and the welding wire. One method of controlling short circuit behavior is welding current reduction during short-to-arc and arc-to-short transitions via current regulation or a secondary switch in the welding power supply.

In other applications, the controlled short circuits may be created by a reciprocating wire feed system configured to oscillating the welding wire in and out of the advancing weld puddle. By oscillating the welding wire in and out of the weld puddle, liquid at the end of the welding wire may be dipped into the puddle mechanically and detached from the welding wire when the wire is pulled out of the puddle, thereby accomplishing a "controlled short circuit" effect. In addition to controlled short circuit in consumable electrode arc welding, reciprocating wire feed is also useful in non-consumable electrode arc welding with filler metal, such as hot wire or cold wire TIG, where the welding wire is oscillated by reciprocating wire feed and fed into a melt puddle created by non-consumable TIG arc. Typically, mechanical motion of the wire is slow. To achieve desired higher deposition and faster welding travel speed, the wire must move bidirectionally in excess of 1000 inches per minute and at a rate in excess of 100 Hz at 100% duty cycle. Traditional reciprocating wire feed systems use bidirectional motors, which typically have relatively high torque requirements to overcome the inertia of the motor, the drive rolls and/or gears. In addition, bidirectional motors may have limitations on the reciprocating frequency (which in turn imposes limitations on wire feed and travel speeds and productivity), and may be susceptible to overheating, and/or may be oversized, which may cause weld joint accessibility issues.

BRIEF DESCRIPTION

In certain embodiments, a welding wire delivery system includes a non-rotational actuator configured to engage, disengage, and move welding wire. In certain embodiments, the welding wire delivery system includes a piezoelectric walk motor, a piezoelectric worm drive, a piezoelectric wave drive, a shape memory alloy, a solenoid piston, a linear actuator or motor, or a voice coil actuator. In general, none of the components of the welding wire delivery system include actuation mechanisms (i.e., the mechanisms that generate the forces that cause the movement of the welding wire) that rotate to drive the welding wire.

DETAILED DESCRIPTION

As will be appreciated, the disclosed embodiments provide improvements over traditional reciprocating wire feed systems (e.g., systems that utilize bidirectional motors). For example, certain embodiments of the disclosed wire feed systems may utilize a piezoelectric mechanism, such as a piezoelectric walk motor, piezoelectric worm drive, or other piezoelectric mechanism, that may be cheaper, smaller, less susceptible to overheating, may use less torque than bidirectional motors, and may enable a change of wire direction at higher frequencies. Additionally, the disclosed embodiments may be used in existing welding wire feed systems. In other words, existing welding wire feed systems may be retrofitted to include the disclosed piezoelectric wire feed mechanisms. The disclosed embodiments may also enable improvement in arc starting, reduction in spatter during a welding operation, higher travel speeds, weld grain refinement, higher ductility, and other improvements to the welding operation. While the present disclosure describes embodiments in a welding system context, the present techniques may also be used in other processes, such as cladding or brazing, that also use consumable electrodes.

Figure 1:
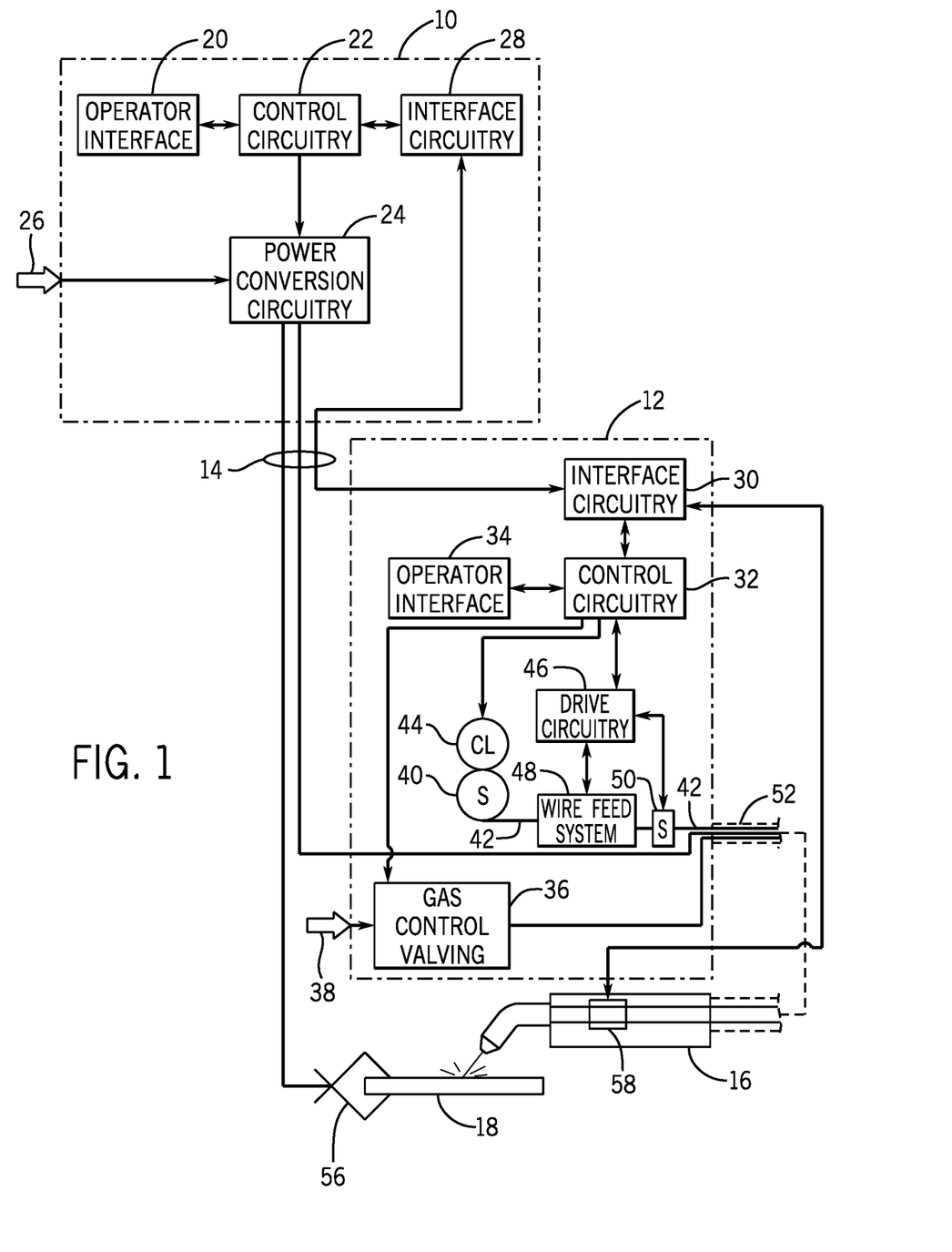
FIG. 1 is a diagrammatical representation of a welding system that includes a welding torch having a wire feed system that includes a piezoelectric mechanism for feeding welding wire through the welding torch, in accordance with an embodiment of the present disclosure.

Turning now to the drawings, and referring first to FIG. 1, an exemplary welding system is illustrated as including a power supply 10 and a wire feeder 12 coupled to one another via conductors or conduits 14. For example, the welding system may be an automated welding system that is automated robotically. In the illustrated embodiment, the power supply 10 is separate from the wire feeder 12, such that the wire feeder 12 may be positioned at some distance from the power supply 10 near a welding location. However, it should be understood that the wire feeder 12, in some implementations, may be integral with the power supply 10. In such cases, the conduits 14, except for the ground conduit, would be internal to the system. In embodiments in which the wire feeder 12 is separate from the power supply 10, terminals are typically provided on the power supply 10 and on the wire feeder 12 to allow the conductors or conduits 14 to be coupled to the systems so as to allow for power and gas to be provided to the wire feeder 12 from the power supply 10, and to allow data to be exchanged between the two devices.

The system is designed to provide wire, power and shielding gas to a welding torch 16. As will be appreciated by those skilled in the art, the welding torch 16 may be of many different types, and typically allows for the feed of a welding wire and gas to a location adjacent to a workpiece 18 where a weld is to be formed to join two or more pieces of metal. A second conductor 14 is typically run to the welding workpiece 18 so as to complete an electrical circuit between the power supply 10 and the workpiece 18.

The system is designed to allow for weld parameter settings to be selected by the operator, particularly via an operator interface 20 provided on the power supply 10. The operator interface 20 will typically be incorporated into a front faceplate of the power supply 10, and may allow for selection of settings such as the weld process, the type of wire to be used, voltage and current settings, and so forth. In particular, the system is designed to allow for welding with a consumable electrode, such as various steels, aluminums, or other welding wire that is channeled through the welding torch 16. These weld settings are communicated to control circuitry 22 within the power supply 10. The system may be particularly adapted to implement welding regimes designed for certain electrode types.

The control circuitry 22 operates to control generation of welding power output that is applied to the welding wire for carrying out the desired welding operation. The control circuitry 22 is coupled to power conversion circuitry 24. This power conversion circuitry 24 is adapted to create the output power applied to the welding wire at the welding torch 16. Various power conversion circuits may be employed, including choppers, boost circuitry, buck circuitry, inverters, converters, and so forth. The configuration of such circuitry 24 may be of types generally known in the art in and of itself. The power conversion circuitry 24 is coupled to a source of electrical power as indicated by arrow 26. The power 26 applied to the power conversion circuitry 24 may originate in the power grid, although other sources of power may also be used, such as power generated by an engine-driven generator, batteries, fuel cells or other alternative sources. Finally, the power supply 10 illustrated in FIG. 1 includes interface circuitry 28 designed to allow the control circuitry 22 to exchange signals with the wire feeder 12.

The wire feeder 12 includes complementary interface circuitry 30 that is coupled to the interface circuitry 28. In some embodiments, multi-pin interfaces may be provided on both components and a multi-conductor cable run between the interface circuitries 28, 30 to allow for such information as wire feed speeds, processes, selected currents, voltages or power levels, and so forth to be set on either the power supply 10, the wire feeder 12, or both.

The wire feeder 12 also includes control circuitry 32 coupled to the interface circuitry 30. The control circuitry 32 allows for wire feed speeds to be controlled in accordance with operator selections, and permits these settings to be fed back to the power supply 10 via the interface circuitry 30. The control circuitry 32 is coupled to an operator interface 34 on the wire feeder 12 that allows selection of one or more welding parameters, particularly wire feed speed. The operator interface 34 may also allow for selection of such weld parameters as the process, the type of wire utilized, current, voltage or power settings, and so forth. The control circuitry 32 is also coupled to gas control valving 36 which regulates the flow of shielding gas to the welding torch 16. In general, such gas is provided at the time of welding, and may be turned on immediately preceding the weld and for a short time following the weld. The gas applied to the gas control valving 36 is typically provided in the form of pressurized bottles, as represented by reference numeral 38.

The wire feeder 12 includes components for feeding wire to the welding torch 16 and thereby to the welding application, under the control of the control circuitry 32. For example, one or more supplies (e.g., spool, box, etc.) of welding wire 42 may be housed in the wire feeder 12. Welding wire 42 is fed from a wire supply 40 (e.g., a spool) and is progressively fed to the welding torch 16. The wire supply 40 may be associated with a clutch 44 that disengages the wire supply 40 when welding wire 42 is to be fed to the welding torch 16. The clutch 44 may also be regulated to maintain a minimum friction level to avoid free spinning of the wire supply 40. Drive circuitry 46 is provided that engages with a wire feed system 48 to push the welding wire 42 from the wire feeder 12 towards the welding torch 16. In particular, the wire feed system 48 is configured to move the welding wire 42 toward the welding torch 16 (and thus the workpiece 18) to enable a "controlled short circuit" operation of the welding torch 16. For example, in certain embodiments, the wire feed system 48 may be driven by the drive circuitry 46 to drive the welding wire 42 from the wire feeder 12. In certain embodiments, the drive circuitry 46 may include an amplifier made of power operational amplifiers (op-amps), MOSFETs, transistors, and/or resistor-capacitor (RC) circuitry with logic gate pulsing circuitry or high peak-to-peak voltage driver circuitry with outputs matching resonance frequencies of the piezoelectric mechanisms, piezoelectric actuators, and so forth, in the wire feed system 48, as described herein. It will be appreciated that, in certain embodiments, the control circuitry 32 and/or the drive circuitry 46 of the wire feeder 12 may similarly drive a wire feed system 58 in the welding torch 16. Furthermore, in embodiments where the wire feeder 12 is note used (e.g., when only the wire feed system 58 in the welding torch 16 used), the power supply 10 may instead include drive circuitry for controlling the drive of the wire feed system 58 in the welding torch 16.

Finally, in certain embodiments, a wire feed speed sensor 50 may be provided for detecting the speed of the welding wire 42. In certain embodiments, the wire feed speed sensor 50 may be configured to directly detect the speed at which the welding wire 42 is fed from the wire feeder 12. For example, in certain embodiments, the wire feed speed system 50 may include an idler roll coupled with an encoder that directly interfaces with the welding wire 42 to directly measure the actual wire feed speed. In certain embodiments, signals from the wire feed speed sensor 50 may be fed back to the control circuitry 32, such as for closed loop feedback control or feed-forward control.

Power from the power supply 10 is applied to the welding wire 42, typically by means of a composite cable 52 (or separate cables) in a conventional manner for wire, gas, and welding current/voltage/power. Similarly, in certain embodiments, shielding gas is fed through the wire feeder 12 and the composite cable 52. In addition, in certain embodiments, the composite cable 52 may include one or more control cables for driving piezoelectric mechanisms, piezoelectric actuators, and/or control signal amplifiers in the wire feed system 58 disposed in the welding torch 16. During welding operations, the welding wire 42 is advanced through the composite cable 52 towards the welding torch 16. Upon receiving commands from a weld sequence controller (e.g., inside the control circuitry 22 inside power source 10), gas flow is begun, welding wire 42 is advanced, power is applied to the composite cable 52 and through the welding torch 16 to the advancing welding wire 42. Finally, a workpiece cable and clamp 56 allow for closing an electrical circuit from the power supply 10 through the welding torch 16, the welding wire 42, the arc, and the workpiece 18 back to the power conversion circuitry 24.

Although the drive circuitry 46, wire feed system 48, and wire feed speed sensor 50 are shown inside wire feeder 12 in FIG. 1, these elements may be separate components or may be components of another system. In some embodiments, there may be one or two wire feed systems 48, 58 for wire delivery. For example, when the frictional resistance of wire to liner is high or spool inertia must be overcome, a dual feeder arrangement may be used. In such an embodiment, one wire feed system 48 in the wire feeder 12 may be considered the "assist wire feed system" to push the welding wire 42 through the composite cable 52 from the wire supply 40 to the welding torch 16, while another wire feed system 58 in the welding torch 16 may be considered the "main wire feed system" to pull the welding wire 42 through the composite cable 52. In such embodiments, the two wire feed systems 48, 58 may be synchronized by the control circuitry 22 of the power supply 10 and/or the control circuitry 32 of the wire feeder 12 (e.g., through the interface circuitry 28, 30 of the power supply 10 and/or the wire feeder 12). Such embodiments may be referred to as a "push-pull" wire feed system; however, it will be appreciated that a "push-push" wire feed system may also be implemented. In other embodiments, the wire feed system 58 may be used instead of the wire feed system 48 of the wire feeder 12. In such an embodiment, the composite cable 52 may be directly connected to the power supply 10, and the control circuitry 32 of the wire feeder 12 may instead be located in the power supply 10 to, for example, control the piezoelectric drive of the wire feed system 58. Regardless, in certain embodiments, the wire feed systems 48, 58 may function in a substantially similar manner, as described herein.

It should be noted that other system arrangements and input schemes may also be implemented. For example, the welding wire 42 may be fed from a bulk storage container (e.g., a drum) or from one or more spools outside of the wire feeder 12. Similarly, in certain embodiments, the welding wire 42 may be fed from a "spool gun" in which a spool is mounted on or near the welding torch 16. In such embodiments, the wire feeder 12 may not even be used. Rather, in such embodiments, only the wire feed system 58 in the welding torch 16 may be used to pull the welding wire 42 from the spool mounted on or near the welding torch 16. Regardless, as described in greater detail herein, the wire feed system 58 in the welding torch 16 includes piezoelectric mechanisms in which electrical fields are applied to piezoelectric members, thereby generating mechanical deformation in the piezoelectric members that facilitates delivery of the welding wire 42 through the welding torch 16 by pulling the welding wire 42 through the welding torch 16. For example, in certain embodiments, the wire feed system 58 in the welding torch 16 may include a piezoelectric walk motor or piezoelectric worm drive, as described in greater detail herein.

Figure 2:
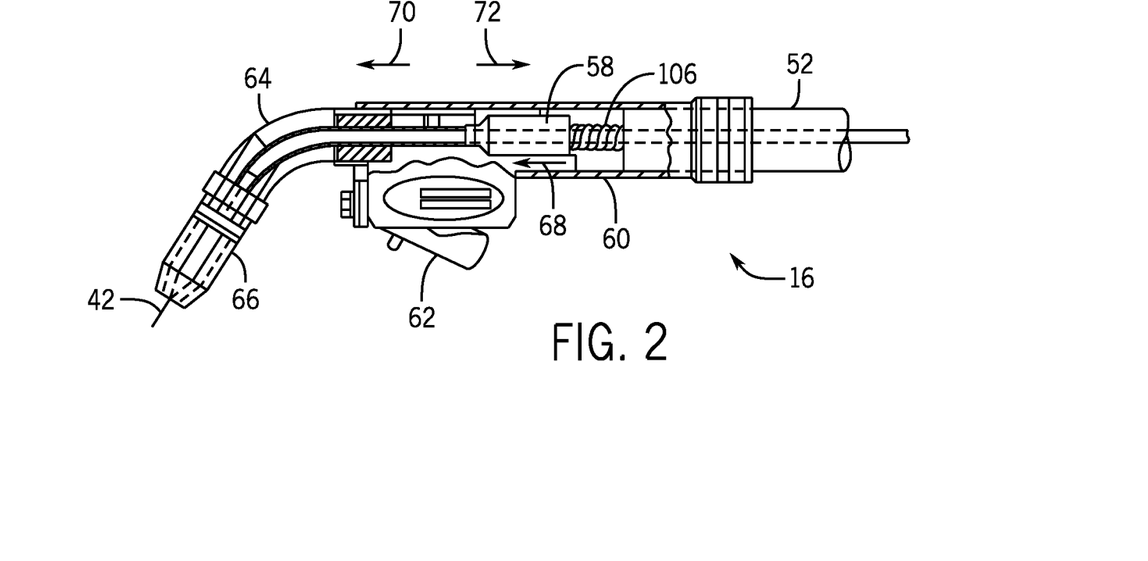
FIG. 2 is a cutaway side view of the welding torch of FIG. 1 configured for manual welding operations, in accordance with an embodiment of the present disclosure.

FIG. 2 is a cutaway side view of the welding torch 16 of FIG. 1. As illustrated, the welding torch 16 includes a handle 60, a trigger 62, a neck 64, and a nozzle assembly 66. The composite cable 52 is electrically coupled to the trigger 62. In particular, in certain embodiments, the composite cable 52 includes at least two separate control wires for the trigger 62. The trigger 62 enables a user to control the supply of welding wire 42 and power from the power supply 10 and/or the wire feeder 12. A number of events occur when the trigger 62 is activated (e.g., depressed). One event is that the wire feed system 48 in the wire feeder 12 and/or the wire feed system 58 in the welding torch 16 draw the welding wire 42 from the wire supply 40 in the wire feeder 12 (or a spool mounted on or near the welding torch 16), and feed the welding wire 42 through the composite cable 52 and the welding torch 16. In addition, electric power from the power supply 10 and/or the wire feeder 12 is supplied to the welding wire 42 once the welding wire 42 is moved toward the workpiece 18. Furthermore, in certain embodiments, the welding torch 16 may be adapted to enable the flow of gas 68, which may be controlled by the trigger 62. The welding wire 42 and the flow of gas 68 may be fed through the neck 64 towards the workpiece 18. The nozzle assembly 66 directs the welding wire 42 and the flow of gas 68 towards the workpiece 18.

Figure 3:
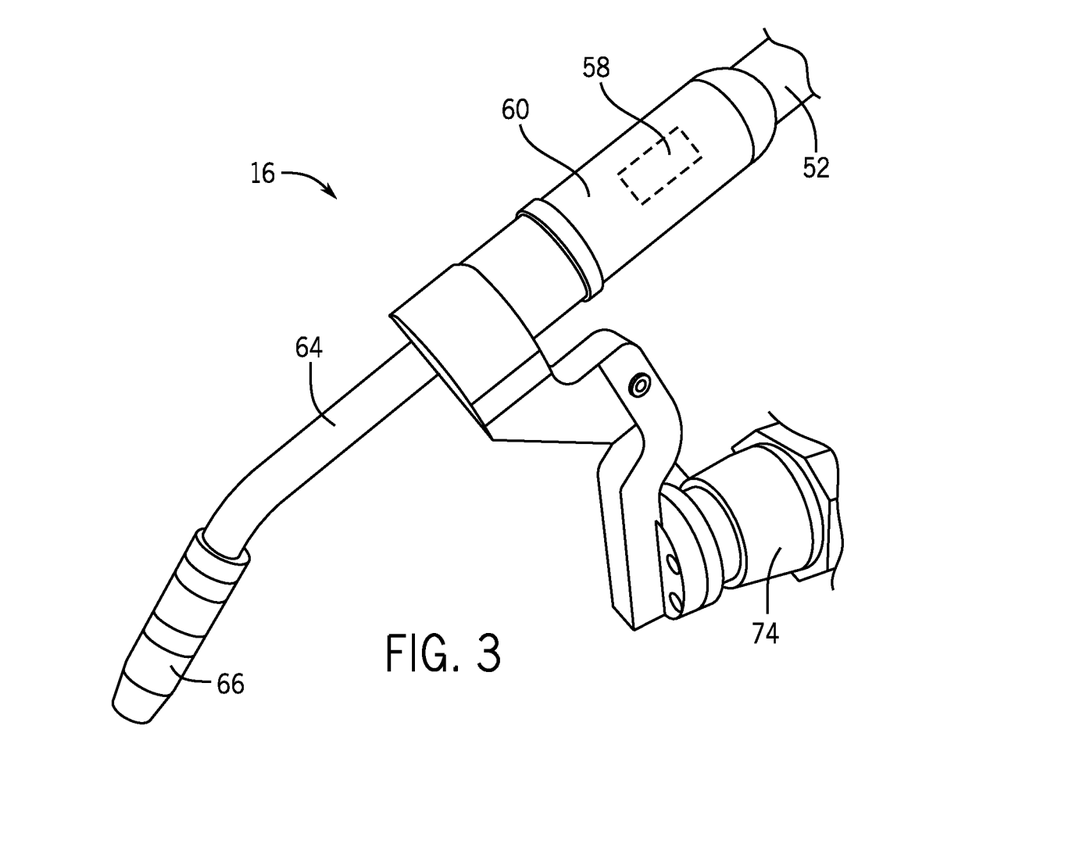
FIG. 3 is a perspective view of the welding torch of FIG. 1 configured for automated welding operations, in accordance with an embodiment of the present disclosure.

In certain embodiments, as described herein, the wire feed system 58 of the welding torch 16 may facilitate not only feeding of the welding wire 42 through the welding torch 16, as illustrated by arrow 70, but also retraction of the welding wire 42 back through welding torch 16, as illustrated by arrow 72. As illustrated in FIG. 3, in certain embodiments, the wire feed system 58 may be disposed within the handle 60 of the welding torch 16. However, in other embodiments, the wire feed system 58 may be disposed within the neck 64 of the welding torch 16. Indeed, the wire feed system 58 may be disposed within any part of the welding torch 16. In any event, the control circuitry 22, 32 of the power supply 10 and/or the wire feeder 12 (or other control circuitry) may transmit electrical signals to the wire feed system 58 such that electrical fields may be generated in piezoelectric mechanisms of the wire feed system 58 such that the piezoelectric mechanisms are mechanically deformed in such a way that movement (e.g., feeding and/or retraction) of the welding wire 42 through the welding torch 16 is accomplished.

It will be appreciated that while the embodiment of the welding torch 16 illustrated in FIG. 2 is configured for use by a human operator in a manual welding process, in certain embodiments, the welding torch 16 may be used in an automated welding process. For example, as illustrated in FIG. 3, the welding torch 16 may be coupled to a robotic position manipulation system 74, such as the robotic arm illustrated in FIG. 3. In such an embodiment, the welding torch 16 does not include a trigger 62. Rather, the flow of welding wire 42, electrical power, and gas through the welding torch 16 may be entirely controlled by the control circuitry 22, 32 of the power supply 10 and/or the wire feeder 12 (or other control circuitry).

As described herein, the wire feed system 58 of the welding torch 16 includes piezoelectric members in which electrical fields are generated that cause mechanical deformations of the piezoelectric members that cause the piezoelectric members to interact with the welding wire 42 to affect movement (e.g., feeding and/or retraction) of the welding wire 42 through the welding torch 16. The piezoelectric members of the wire feed system 58 may include various embodiments. It will be appreciated that the wire feed system 48 of the wire feeder 12 may function in a substantially similar manner as the wire feed system 58 of the welding torch 16, as described herein.

FIGS. 4A through 4G illustrate a series of interactions between piezoelectric members of the wire feed system 58 of the welding torch 16, wherein the wire feed system 58 includes a piezoelectric walk motor (also known as a piezoelectric step drive). As illustrated, in certain embodiments, the wire feed system 58 may include a first plurality of piezoelectric members 76 and a second plurality of piezoelectric members 78, wherein each piezoelectric member of the first plurality of piezoelectric members 76 are configured to be synchronized with the other piezoelectric members of the first plurality of piezoelectric members 76 and each piezoelectric member of the second plurality of piezoelectric members 78 are configured to be synchronized with the other piezoelectric members of the second plurality of piezoelectric members 78. In general, for example, at any given time, either the first plurality of piezoelectric members 76 or the second plurality of piezoelectric members 78 are in contact with the welding wire 42. Although only illustrated as being disposed on one side of the welding wire 42, in certain embodiments, the piezoelectric members 76, 78 may be disposed on opposite (or even multiple) sides of the welding wire 42.

As illustrated in FIGS. 4A through 4G, each piezoelectric member of the first plurality of piezoelectric members 76 has a relaxed state (see, e.g., FIG. 4C) during which no electrical voltage is being applied to the piezoelectric member, and each piezoelectric member of the second plurality of piezoelectric members 78 has a relaxed state (see, e.g., FIG. 4F) during which no electrical voltage is being applied to the piezoelectric member. From these relaxed states, electrical voltage may be applied to the piezoelectric members to a maximum extended state (see, e.g., FIG. 4F for the first plurality of piezoelectric members 76 and FIG. 4C for the second plurality of piezoelectric members 78).

In certain embodiments, a voltage between 60-200 volts (or even higher) may be applied to the piezoelectric members described herein. In certain embodiments, current/power limit (or crowbar) may be used for protection. The piezoelectric members described herein behave like capacitors, so the drive circuitry of the wire feed system 58 provides charge for the capacitive load of the piezoelectric members. In certain embodiments, the drive circuitry (e.g., drive circuitry 46 in the case where a wire feeder 12 is used, similar drive circuitry of the power supply 10 in the case where a wire feeder 12 is not used, or similar drive circuitry in the welding torch 16 itself) of the wire feed system 58 may comprise a low/high voltage amplifier to drive a low/high piezoelectric actuator of the wire feed system 58. In certain embodiments, the amplifier may be physically located near the piezoelectric members while the rest of drive circuitry may be located inside the power supply 10 and/or the wire feeder 12 (i.e., remotely from the wire feed system 58). The drive circuitry may operate in either a closed loop mode or an open loop mode depending on whether, for example, a position sensor is used to close a position loop. In certain embodiments, the drive circuitry may include a temperature sensor as the operating temperature of the welding torch 16 may be elevated in the vicinity of the arc, and the piezoelectric capacitance of the piezoelectric members may be sensitive to such elevated temperatures. In certain embodiments, the drive circuitry may take capacitance non-linearity and temperature dependency of the piezoelectric load of the piezoelectric members into consideration, and compensate for them. In certain embodiments, the drive circuitry may also incorporate power recovery to recover reactive energy not used by the piezoelectric actuator of the wire feed system 58.

Figure 4A:
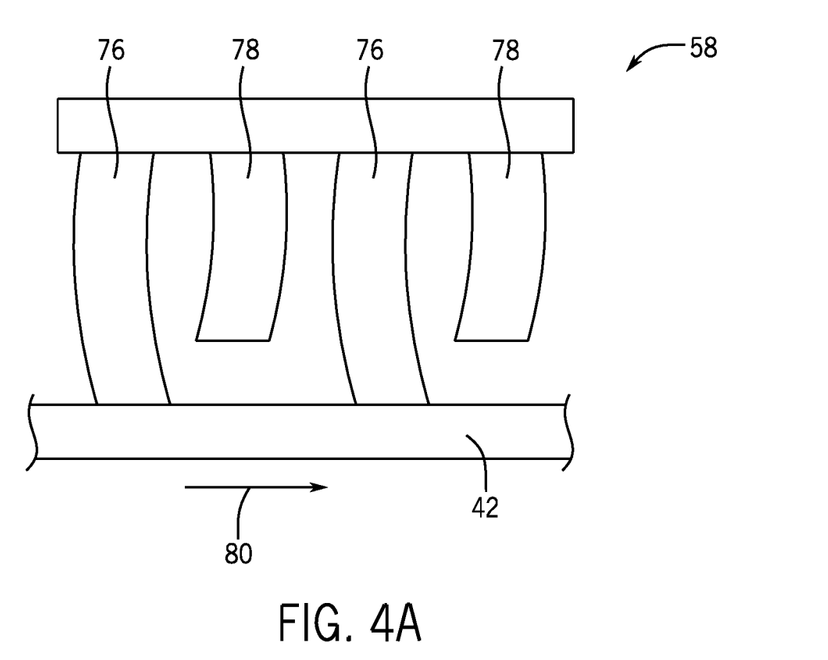
FIGS. 4A through 4G illustrate a series of interactions between piezoelectric members of the wire feed system of the welding torch of FIG. 1, wherein the wire feed system includes a piezoelectric walk motor, in accordance with an embodiment of the present disclosure.
Figure 4B:
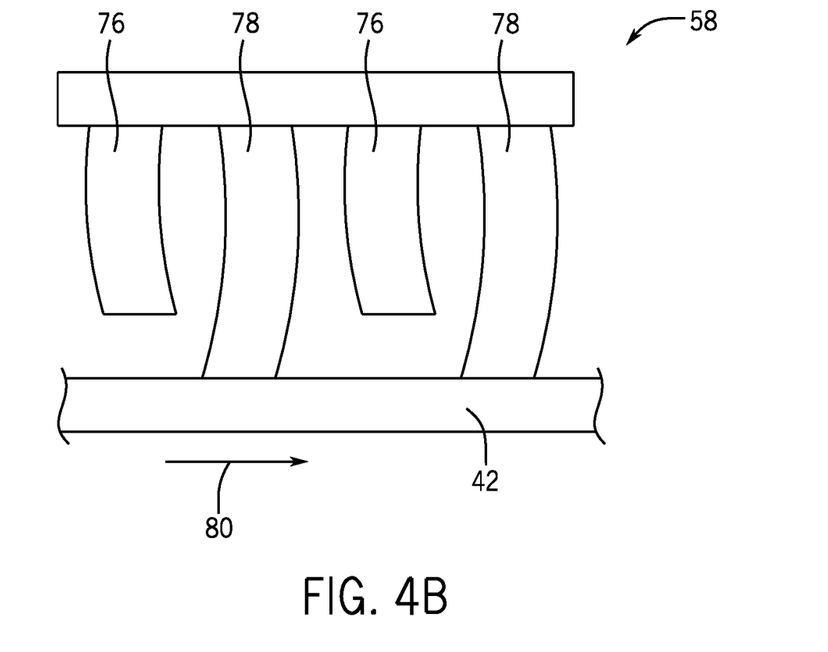
Figure 4C:
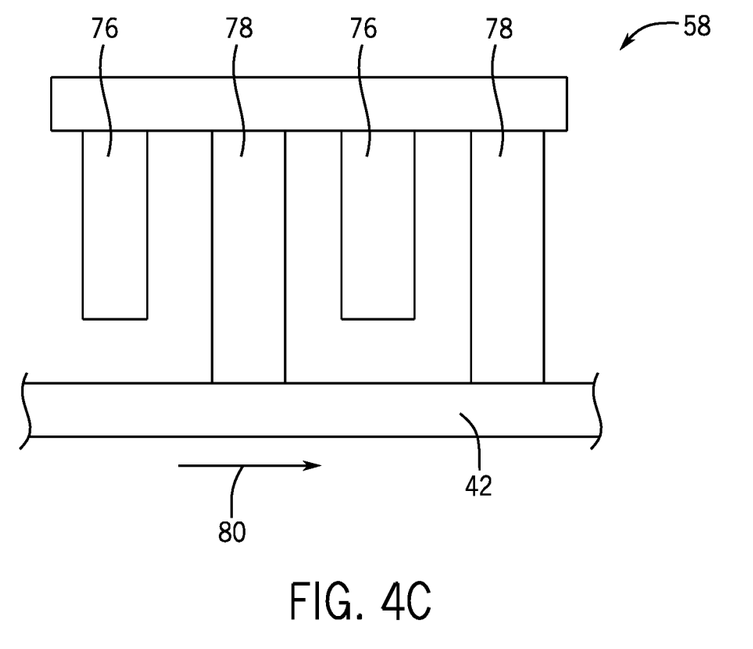
Figure 4D:
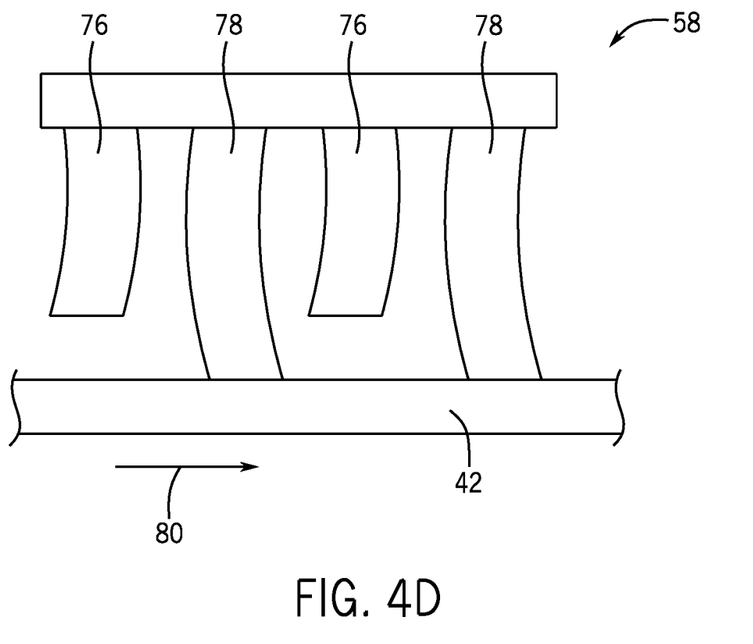
Figure 4E:
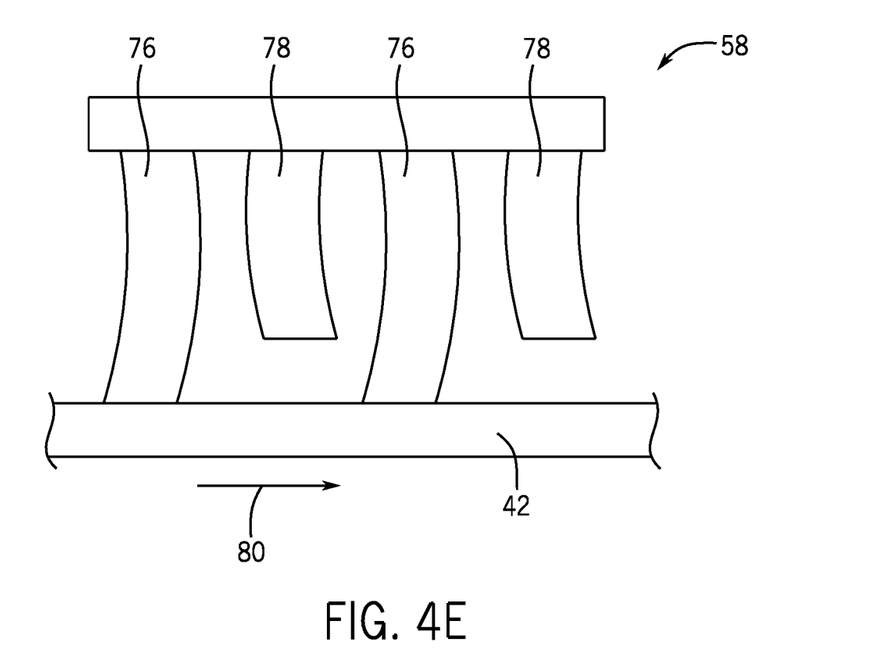
Figure 4F:
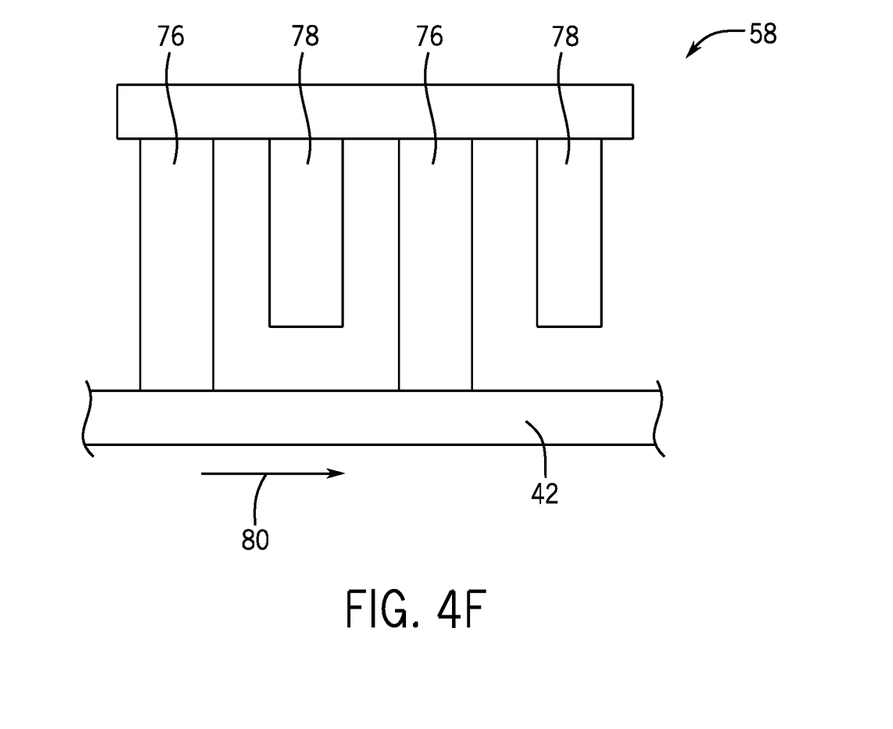
Figure 4G:
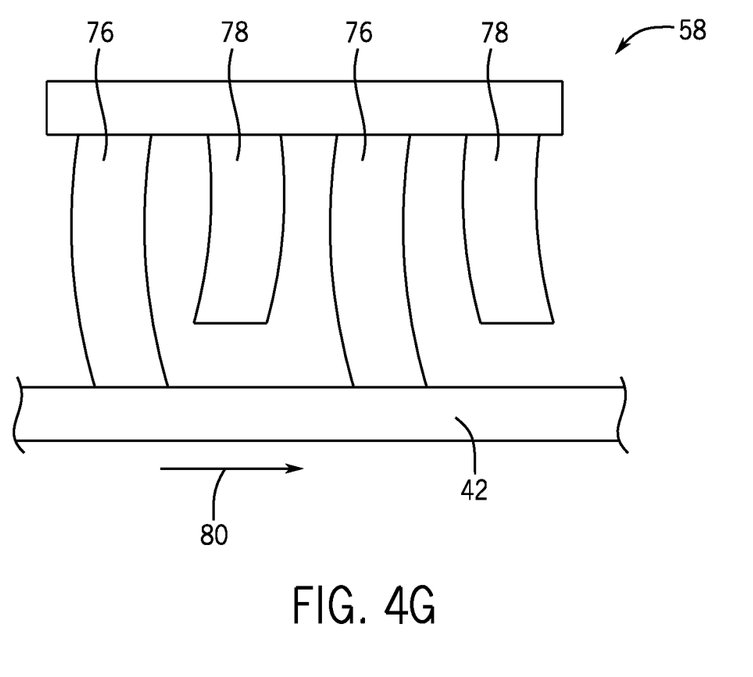

It will be appreciated that the cyclical nature of the first plurality of piezoelectric members 76 and the second plurality of piezoelectric members 78 causes the first plurality of piezoelectric members 76 and the second plurality of piezoelectric members 78 to alternatively contact the weld wire 42, and indeed cause the alternating first plurality of piezoelectric members 76 or second plurality of piezoelectric members 78 to move (e.g., feed) the welding wire 42 in an axial direction 80 through the welding torch 16. More specifically, FIGS. 4E through 4G illustrate the first plurality of piezoelectric members 76 contacting the welding wire 42 and causing the movement of the welding wire 42 in the axial direction 80, whereas FIGS. 4B through 4D illustrate the second plurality of piezoelectric members 78 contacting the welding wire 42 and causing the movement of the welding wire 42 in the axial direction 80. It will be appreciated that the cyclical actuation of the first plurality of piezoelectric members 76 and the second plurality of piezoelectric members 78 illustrated in FIGS. 4A through 4G may also be reversed to cause movement (e.g., retraction) in an axial direction opposite the axial direction 80.

Alternatively, FIGS. 5A through 5F illustrate a series of interactions between piezoelectric members of the wire feed system 58 of the welding torch 16, wherein the wire feed system 58 includes a piezoelectric worm drive (also known as inchworm motor). As illustrated, in certain embodiments, the wire feed system 58 may include a first piezoelectric member 82 and a second piezoelectric member 84 having longitudinal axes generally perpendicular to a longitudinal axis of the welding wire 42, and a third piezoelectric member 86 disposed between the first and second piezoelectric members 82, 84 and having a longitudinal axis generally parallel to the longitudinal axis of the welding wire 42. Although only illustrated as being disposed on one side of the welding wire 42, in certain embodiments, the piezoelectric members 82, 84, 86 may be disposed on opposite (or even multiple) sides of the welding wire 42.

Indeed, in all embodiments described herein, it may be possible to support the welding wire 42 on opposite sides of the welding wire 42 with rolls, balls, disks, or cylinders as bearings (e.g., as passive supports) to balance the lateral force applied to the welding wire 42 by piezoelectric actuators, as well as the other non-rotational actuators described herein. In addition, in certain embodiments, mirror setups of piezoelectric actuators, as well as the other non-rotational actuators described herein, may be used on opposite sides of the welding wire 42 (e.g., as active supports).

Figure 5A:
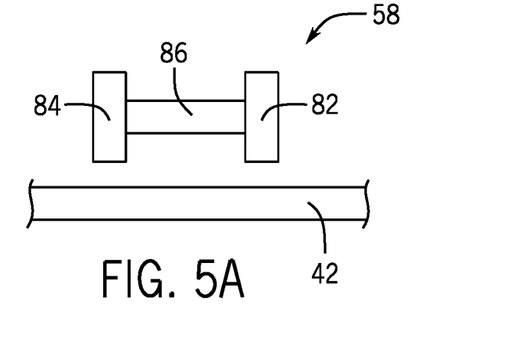
FIGS. 5A through 5F illustrate a series of interactions between piezoelectric members of the wire feed system of the welding torch of FIG. 1, wherein the wire feed system includes a piezoelectric worm drive, in accordance with an embodiment of the present disclosure.
Figure 5B:
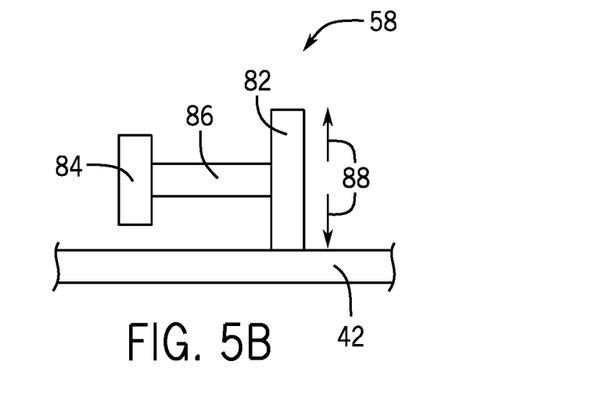
Figure 5C:
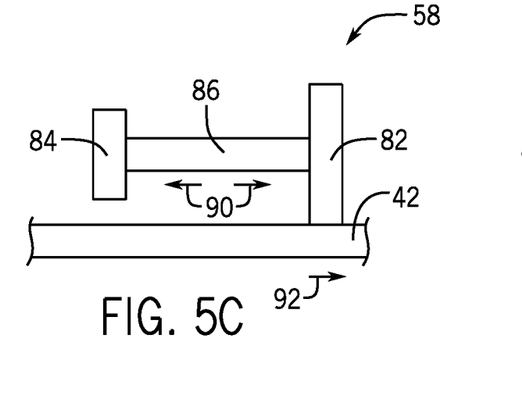

As illustrated in FIG. 5A, each of the piezoelectric members 82, 84, 86 may start in a relaxed state during which no electrical current is being applied to the piezoelectric members 82, 84, 86. Then, an electrical current is applied to the first piezoelectric member 82, thereby causing the first piezoelectric member 82 to expand, as illustrated by arrows 88, such that the first piezoelectric member 82 places a force on the welding wire 42 (see FIG. 5B). Then, while the electrical current is maintained in the first piezoelectric member 82 (and, thus, the force from the first piezoelectric member 82 is maintained against the welding wire 42), an electrical current may be applied to the third piezoelectric member 86 while the second piezoelectric member 84 is held in place, thereby causing the third piezoelectric member 86 to expand, as illustrated by arrows 90, such that the third piezoelectric member 86 causes the welding wire 42 to be moved in the axial direction 92 (see FIG. 5C).

Figure 5D:
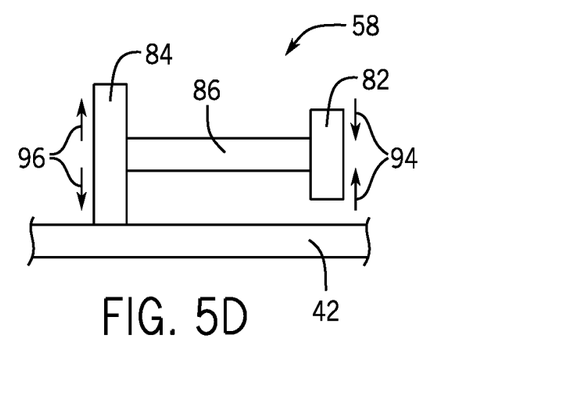
Figure 5E:
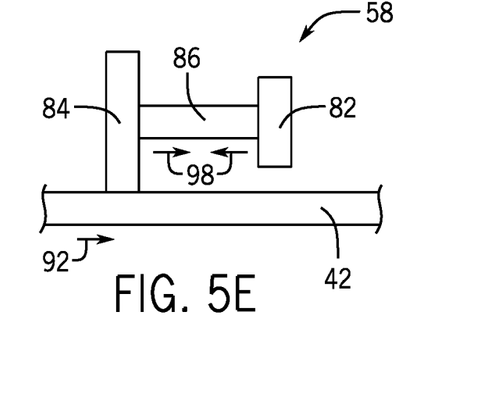
Figure 5F:
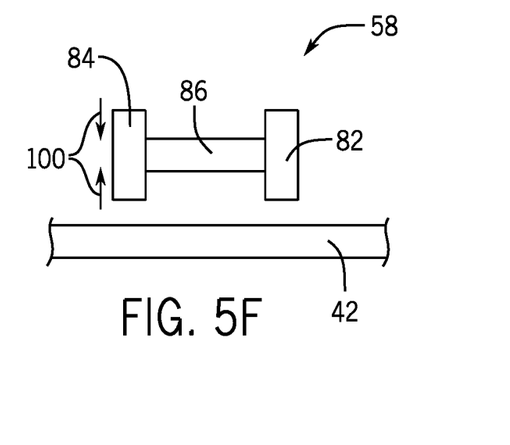
Figure 6A:
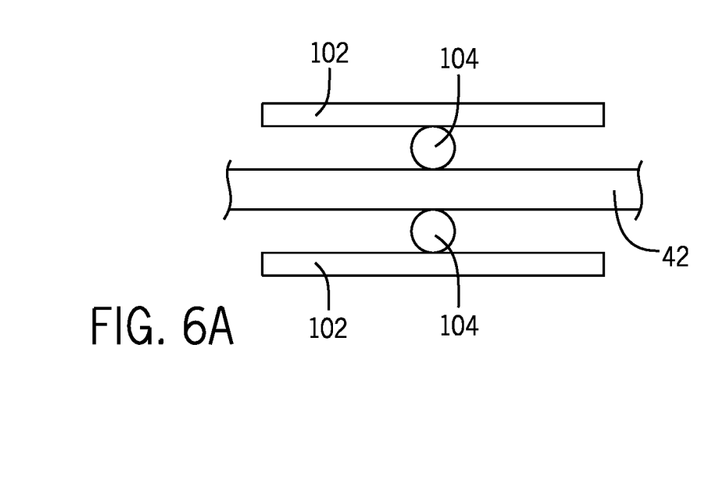
FIGS. 6A through 6D illustrate a series of interactions between piezoelectric members of the wire feed system of the welding torch of FIG. 1, wherein the wire feed system includes a piezoelectric wave drive, in accordance with an embodiment of the present disclosure.
Figure 6B:
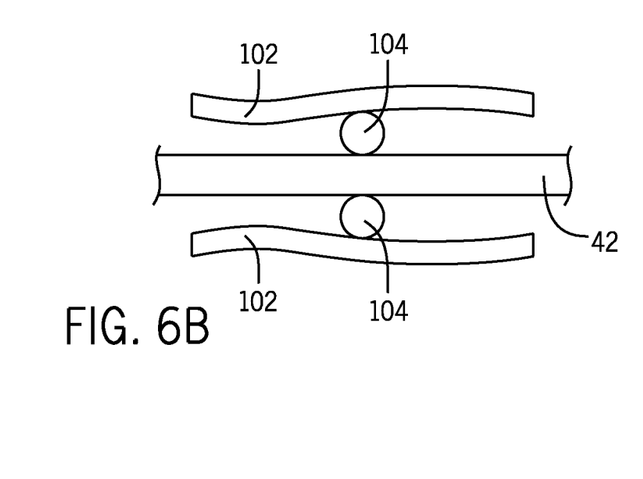
Figure 6C:
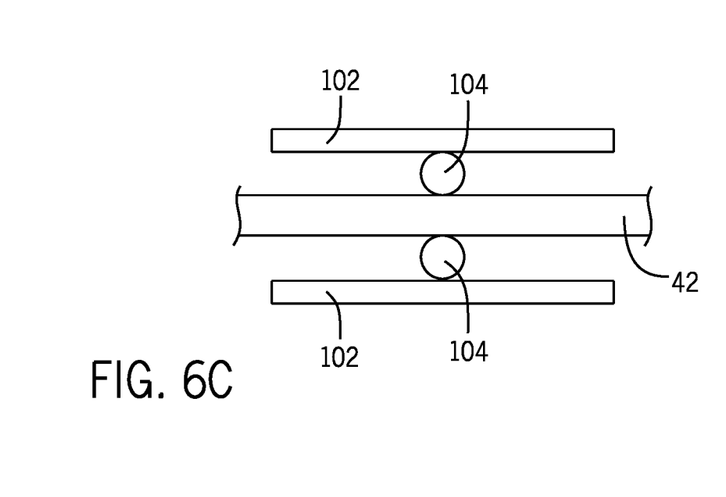
Figure 6D:
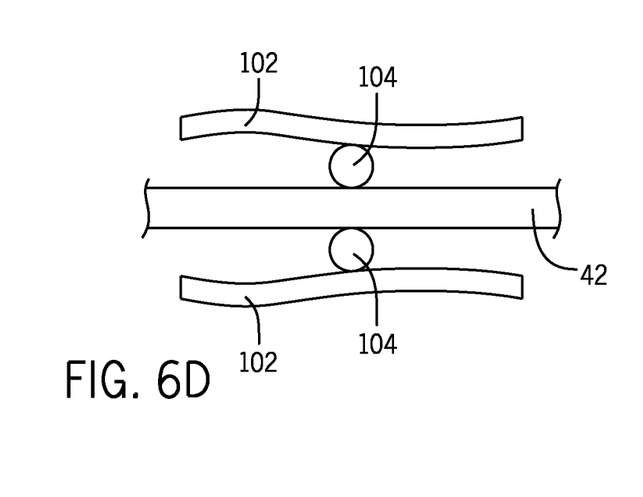

Then, the electrical voltage applied to the first piezoelectric member 82 is removed, thereby causing the first piezoelectric member 82 to contract, as illustrated by arrows 94, such that the force from the first piezoelectric member 82 against the welding wire 42 is removed (see FIG. 5D). In addition, at around the same time, an electrical voltage is applied to the second piezoelectric member 84, thereby causing the second piezoelectric member 84 to expand, as illustrated by arrows 96, such that the second piezoelectric member 84 places a force on the welding wire 42 (see FIG. 5D). Then, while the electrical voltage is maintained in the second piezoelectric member 84 (and, thus, the force from the second piezoelectric member 84 is maintained against the welding wire 42), the electrical voltage applied to the third piezoelectric member 86 is removed while the first piezoelectric member 82 is held in place, thereby causing the third piezoelectric member 86 to contract, as illustrated by arrows 98, such that the third piezoelectric member 86 causes the welding wire 42 to be moved in the axial direction 92 again (see FIG. 5E). Then, the electrical voltage applied to the second piezoelectric member 84 is removed, thereby causing the second piezoelectric member 84 to contract, as illustrated by arrows 100, bringing the wire feed system 58 back to the relaxed state similar to FIG. 5A (see FIG. 5F). It will be appreciated that the cyclical actuation of the piezoelectric members 82, 84, 86 illustrated in FIGS. 5A through 5F may also be reversed to cause movement (e.g., retraction) in an axial direction opposite the axial direction 92.

Alternatively, FIGS. 6A through 6D illustrate a series of interactions between piezoelectric members of the wire feed system 58 of the welding torch 16, wherein the wire feed system 58 includes a piezoelectric wave drive. As illustrated, in certain embodiments, the wire feed system 58 may include a plurality of piezoelectric wave members 102, which when electrical voltage is alternatingly applied and removed from, move in a "wave-like" pattern. In certain embodiments, the wave-like patterns of the piezoelectric wave members 102 interact with cylindrical rings or spherical balls that interact with the welding wire 42, thereby causing the welding wire 42 to move in an axial direction (either back or forth, depending on the actuation patterns of the piezoelectric wave members 102).

Regardless of the specific piezoelectric configurations, in certain embodiments, the wire feed system 58 of the welding torch 16 includes piezoelectric members (e.g., piezoelectric crystal materials, piezoelectric-ceramic materials, lead zirconate titanate (PZT) materials, etc.) that interact with the welding wire 42 to effectuate movement of the welding wire 42 through the welding torch 16. In other embodiments, the wire feed system 58 may include other types of materials configured to expand and contract upon application of electrical signals, and to interact with the welding wire 42 in similar fashion to the embodiments described with respect to FIGS. 4-6. In addition, the embodiments illustrated in FIGS. 4-6 are merely exemplary, and not intended to be limiting of the specific non-rotational mechanical features that may be implemented in the wire feed system 58 of the welding torch 16.

Returning now to FIG. 2, in certain embodiments, the composite cable 52, the wire liner 106 that is disposed at least partially within the welding torch 16 and the composite cable 52, or both, may include an actively driven piezoelectric worm drive or piezoelectric wave drive, similar to the embodiments illustrated with respect to FIGS. 5 and 6, or a combination of an actively driven worm drive and passive rollers interleaved together to facilitate delivery of the welding wire 42. In certain embodiments, the piezoelectric members may be distributed throughout either the wire liner 106 or the composite cable 52 (e.g., every foot or so) and may be simply used as wire brakes, which may help prevent the welding wire 42 from becoming crunched up inside the wire liner 106, for example, when a robot makes air move gyrations, and welding wire 42 would otherwise shoot out relatively abruptly during the next arc start. Although the individual piezoelectric members may be relatively small in size, the collective power of a plurality of piezoelectric members distributed along the wire delivery path (e.g., along the length of the liner 106 and/or the composite cable 52) may be used to propel the welding wire 42 in a distributed fashion. In other words, the plurality of piezoelectric members may collectively form a distributed welding wire delivery system comprising a plurality of low-power and low inertia coordinated actuators configured to deliver the welding wire 42.

The embodiments described herein lead to substantial improvements with respect to arc starting. In conventional arc starts, a slug of current is instantly delivered upon contact and the welding wire 42 explodes, creating the arc and simultaneously throwing off the exploded wire fragment like a fuse. A more graceful way to start the arc is to sense the contact, deliver a small current (e.g., put the power supply 10 in a current limited mode of, for example, 20 amps maximum, or perhaps 50 amps maximum), lift the welding wire 42 up slightly (e.g., 0.1 mm to 1 mm, with a worm drive as discussed with respect to FIGS. 5A through 5F), draw the arc with the limited amperage, then ramp up to a higher current with higher wire feed speed. Using this technique, no chunks of welding wire 42 will be blown off, as with conventional arc starts.

Figure 7:
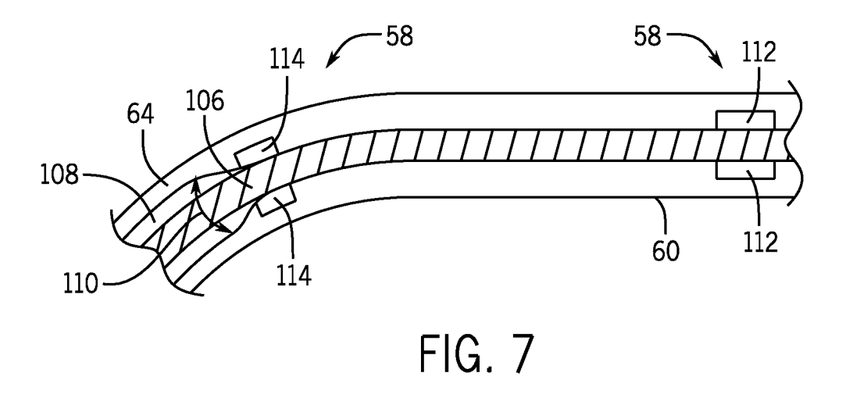
FIG. 7 illustrates an a wire feed system configured to lift welding wire during an arc start, in accordance with an embodiment of the present disclosure.

In certain embodiments, the wire feed system 58 may include a wire lifting device during arc start only. FIG. 7 illustrates an exemplary embodiment that includes a wire feed system 58 configured to lift the welding wire 42 during an arc start. In the illustrated embodiment, the neck 64 of the welding torch 16 includes a cavity 108 that enables the wire liner 106 to move laterally, as illustrated by arrows 110. During the arc start sequence, the welding wire 42 is inched down until a voltage sensor (e.g., disposed in the welding torch 16, the wire feeder 12, or the power supply 10, in certain embodiments) detects a short circuit. At this point in time, the wire feed is stopped or paused, a first actuator 112, such as a piezoelectric member, shape memory alloy, or solenoid piston (e.g., acting as a wire brake), upstream of the cavity 108 is engaged such that a first end of the welding wire 42 is held or fixed in position, while another end of the welding wire 42 (i.e., near the workpiece 18) is free to move. In certain embodiments, the first actuator 112 may be the wire feed system 48 of the wire feeder 12. Then, a small current (e.g., between 15-20 amps, between 10-25 amps, less than 30 amps, less than 40 amps, or less than 50 amps, in certain embodiments) from the power supply 10 is passed through the short circuit. Then, a second actuator 114, such as a piezoelectric member, shape memory alloy, or solenoid piston, may push the wire liner 106 laterally, as illustrated by arrows 110, from one side of the cavity 108 to the other, thus lifting the welding wire 42 off the workpiece 18 to draw an arc at a controlled, relatively low current level (e.g., between 15-20 amps, between 10-25 amps, less than 30 amps, less than 40 amps, or less than 50 amps, in certain embodiments). Then, the relatively low current level may be ramped up by the power supply 10 to a relative high current level (e.g., greater than 60 amps, greater than 70 amps, greater than 80 amps, greater than 90 amps, greater than 100 amps, or even greater, in certain embodiments) while the wire feed speed of the welding wire is gradually increased (e.g., by the actuators 112, 114).

Figure 8:
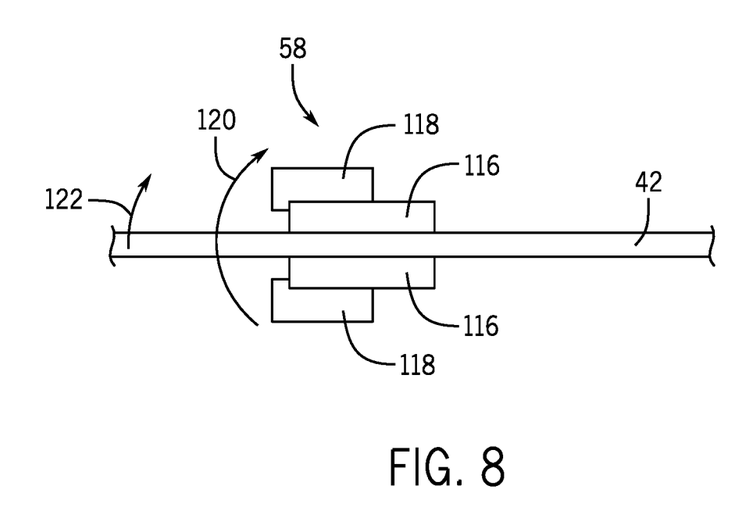
FIG. 8 illustrates a wire feed system having a ring-hook lifting device, which may be actuated by a piezoelectric member, shape memory alloy, or solenoid piston, in accordance with an embodiment of the present disclosure.

Other embodiments of the wire feed system 58 include other lifting devices. For example, FIG. 8 illustrates a wire feed system 58 having a ring-hook lifting device, which may be actuated by a piezoelectric member, shape memory alloy, or solenoid piston. A ring 116 of the ring-hook lifting device surrounds the welding wire 42, but will be lifted by a hook 118 of the ring-hook lifting device on one side (e.g., by a piezoelectric member, shape memory alloy, or solenoid piston), and cocks (or tips over), as illustrated by arrow 120, thereby pulling the welding wire 42, as illustrated by arrow 122. As illustrated, in certain embodiments, the ring 116 of the ring-hook lifting device may have some length, such as a sleeve, to provide better support for the welding wire 42.

Figure 9A:
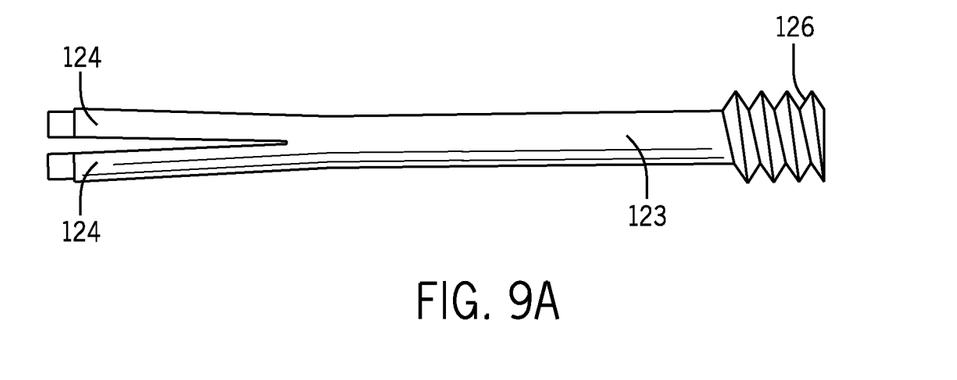
FIGS. 9A and 9B illustrate a wire feed system having multiple tines to grip, propel, and retain welding wire, in accordance with an embodiment of the present disclosure.
Figure 9B:
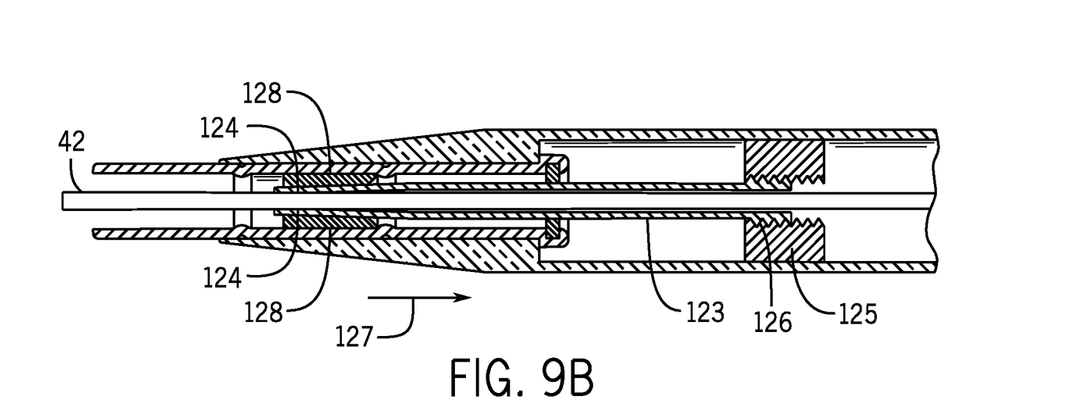

FIGS. 9A and 9B illustrate yet another embodiment of a wire feed system 58 that functions similar to a mechanical pencil, having a collet 123 with multiple tines 124 configured to grip, propel, and retain the welding wire 42 (instead of pencil lead) slightly or in small increments, and can be driven by a linear actuator 125, for example, miniature piezoelectric crystals, voice coil, solenoid, and so forth. The illustrated embodiment includes the collet 123 having threads 126 at one end of the collet 123, which may interact with mating threads of the linear actuator 125, which facilitate the linear actuation of the collet 123. However, different types of linear actuators may be utilized in other embodiments. In certain embodiments, either a clutch type or ratchet type mechanism may be used. FIG. 9A illustrates the collet 123 in its natural shape, with the tines 124 spread apart (e.g., unconstrained). In this state, the opening between the tines 124 is large enough to allow the welding wire to pass through the collet 123 without restriction. In any event, as illustrated in FIG. 9B, once the collet 123 (and the tines 124) are linearly actuated away from the arc, as illustrated by arrow 127, a clutch ring 128 places radially inward forces on the tines 124 (and, thus, the welding wire 42), thereby engaging the welding wire 42 while also moving the welding wire 42 away from the arc. Conversely, when the collet 123 (and the tines 124) are linearly actuated toward the arc (e.g., in an axial direction opposite arrow 127), the tines 124 are again freed to resume their relaxed state (e.g., as illustrated in FIG. 9A), thereby allowing the welding wire 42 to move freely as well. The multiple tines 124 may apply force more evenly around the circumference of the welding wire 42, and may have less of a tendency to bend the welding wire 42. In yet another embodiment, a set of wedge shaped piezoelectric crystals may be used to grip the welding wire 42, while another set of piezoelectric crystals in a flipped orientation grip and retract the welding wire 42. In such an embodiment, the jaws may open and close while moving at 90 degrees angle at the same time when stimulated by a voltage, as described herein. It will be appreciated that, in certain embodiments specific to GMAW processes, the wire feed system 58 illustrated in FIGS. 9A and 9B may be disposed in a wire delivery path between a GMAW contact tip where the welding wire 42 exits the welding torch 16 (e.g., downstream of the wire feed system 58 illustrated in FIGS. 9A and 9B) and a wire feed storage buffer (e.g., a cavity or oversized liner) to take up retracted excess welding wire 42 (e.g., upstream of the wire feed system 58 illustrated in FIGS. 9A and 9B) and a wire drive still engaged with the welding wire 42 during lift (e.g., further upstream).

Although described herein as primarily including piezoelectric members, the embodiments described herein include wire feed systems 58 having myriad non-rotational actuators (as opposed to conventional wire feed drive rolls, which are typically driven by rotating motors) that are capable of engaging and retracting the welding wire 42 slightly. For example, as described herein, the non-rotational actuators may include shape memory alloys, solenoid pistons, linear actuators, linear motors (e.g., with the stator and rotor unfolded), voice coil actuators, and so forth, and may also involve myriad shapes, such as wedges, hooks, sleeves, ratchets, tines, clutches, and so forth, to interact with the welding wire 42. The embodiments described herein are capable of moving welding wire axially in both a forward axial (e.g., feeding) direction as well as a backward axial (e.g., retraction) direction, such that both unidirectional (e.g., feeding) and bidirectional (e.g., feeding and retraction) guidance (e.g., driving) of the welding wire through the welding torch 16 may be accomplished. Furthermore, although described herein as primarily including welding wire delivery systems, in other embodiments, cladding and brazing systems may utilize the disclosed techniques for advancing the consumable electrodes. Similarly, in other embodiments, TIG/laser/plasma systems may utilize the disclosed techniques for advancing the filler metal wire to be added to the melted puddle.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A welding wire delivery system comprising one or more members configured to expand or contract based on electrical voltage applied to the one or more members, wherein the one or more members comprise a non-rotational actuator configured to engage, disengage, and move a welding wire bidirectionally along a wire delivery path by contacting the welding wire based on the expansion or contraction to cause movement of the welding wire.

2. The welding wire delivery system of claim 1, wherein the nonrotational actuator is configured to move the welding wire through a welding torch.

3. The welding wire delivery system of claim 1, wherein the nonrotational actuator is at least partially disposed in a welding torch.

4. The welding wire delivery system of claim 1, wherein the nonrotational actuator is at least partially disposed in a cable configured to couple with a welding torch.

5. The welding wire delivery system of claim 1, wherein the nonrotational actuator is at least partially disposed in a wire feeder that delivers the welding wire to a welding torch.

6. The welding wire delivery system of claim 1, wherein the nonrotational actuator is at least partially disposed along a wire delivery path from a wire supply to an exit end of a welding torch or wire feed tube.

7. The welding wire delivery system of claim 1, wherein the nonrotational actuator comprises a piezoelectric device.

8. The welding wire delivery system of claim 7, wherein the nonrotational actuator comprises a piezoelectric walk motor.

9. The welding wire delivery system of claim 7, wherein the nonrotational actuator comprises a piezoelectric worm drive.

10. The welding wire delivery system of claim 7, wherein the nonrotational actuator comprises a piezoelectric wave drive.

11. The welding wire delivery system of claim 1, wherein the nonrotational actuator comprises a shape memory alloy.

12. The welding wire delivery system of claim 1, wherein the nonrotational actuator comprises a solenoid piston.

13. The welding wire delivery system of claim 1, wherein the nonrotational actuator comprises a linear actuator or linear motor.

14. The welding wire delivery system of claim 1, wherein the nonrotational actuator comprises a voice coil actuator.

15. The welding wire delivery system of claim 1, wherein the nonrotational actuator comprises a wedge-shaped actuator.

16. The welding wire delivery system of claim 1, wherein the welding wire delivery system comprises a piezoelectric walk motor comprising the one or more members.

17. The welding wire delivery system of claim 1, wherein the welding wire delivery system comprises a piezoelectric worm drive comprising the one or more members.

18. The welding wire delivery system of claim 1, wherein the welding wire delivery system comprises a piezoelectric wave drive comprising the one or more members.

* * * * *